April 19, 1966   A. C. NYSTROM ETAL   3,247,036
METHOD OF PRODUCING COMMUNICATIONS CABLE
Filed Oct. 19, 1962   2 Sheets-Sheet 1
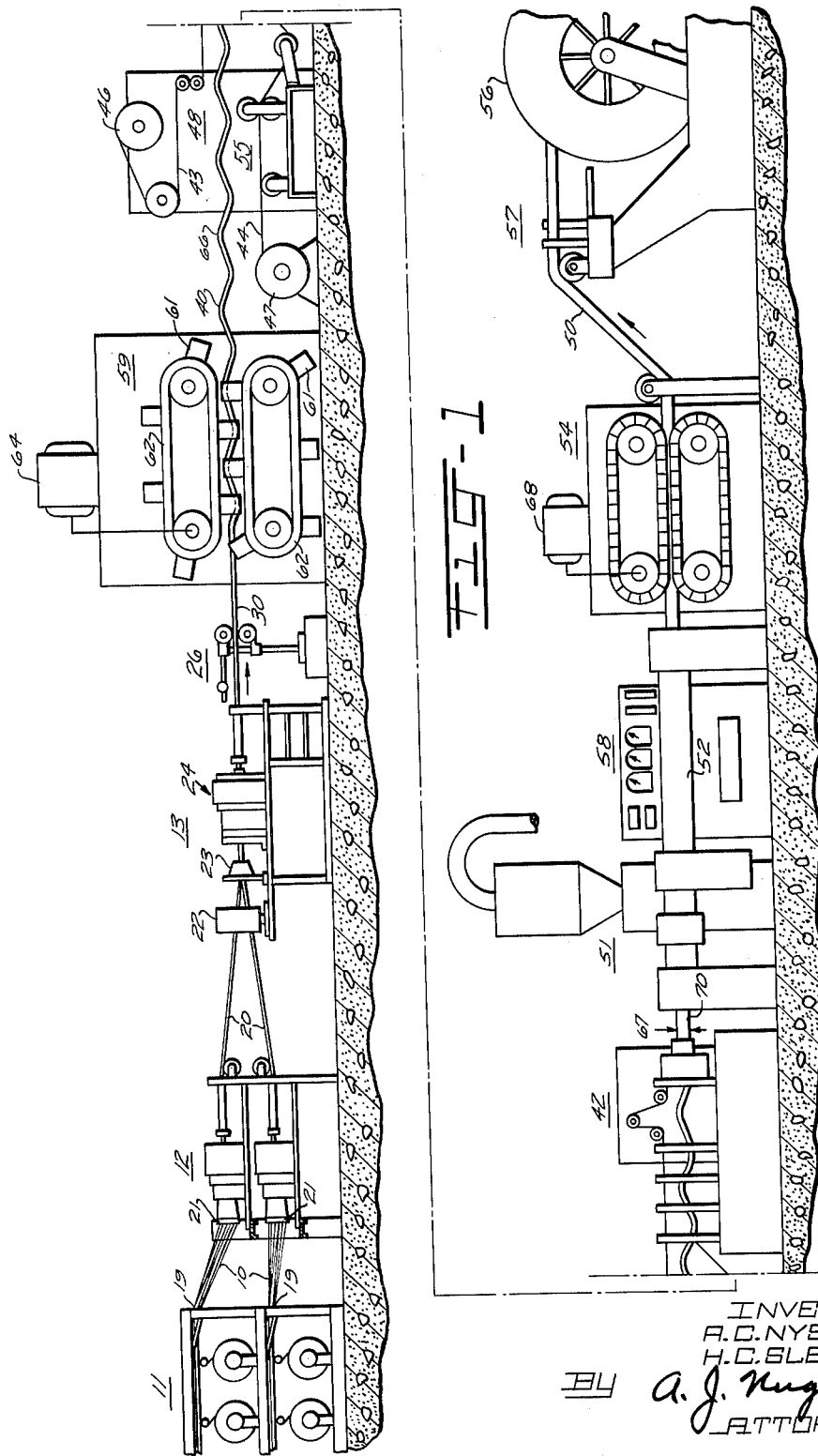
INVENTOR
A. C. NYSTROM
H. C. SLECHTA
BY A. J. Nugent
ATTORNEY April 19, 1966    A. C. NYSTROM ETAL    3,247,036
METHOD OF PRODUCING COMMUNICATIONS CABLE
Filed Oct. 19, 1962    2 Sheets-Sheet 2
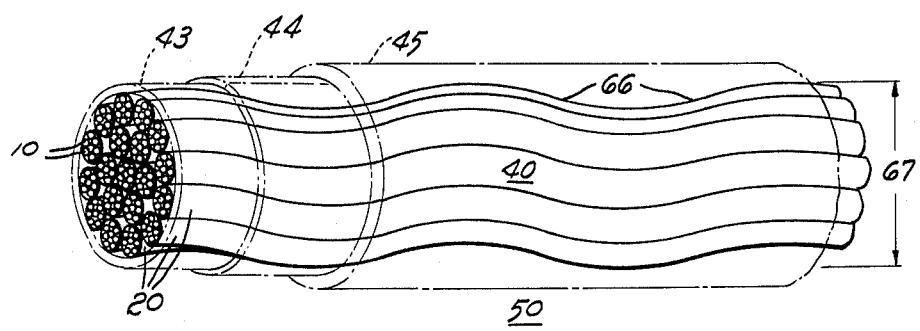
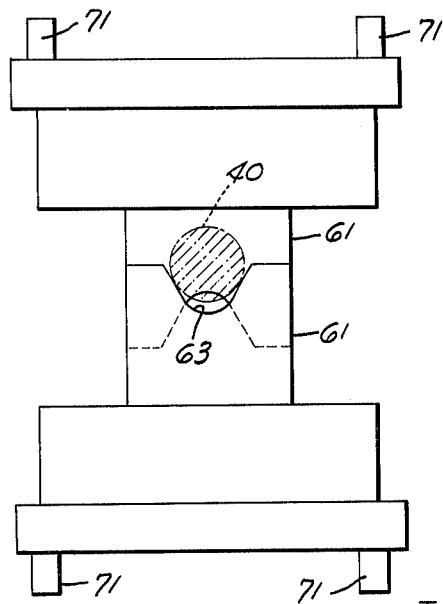
INVENTORS
A. C. NYSTROM
H. C. SLECHTA
BY A. J. Nugent
ATTORNEY

United States Patent Office 3,247,036
Patented Apr. 19, 1966

3,247,036
METHOD OF PRODUCING COMMUNICATIONS CABLE
Axel C. Nystrom, Rutherford, and Henry C. Slechta, Plainfield, N.J., assignors to Western Electric Company, Incorporated, New York, N.Y., a corporation of New York
Filed Oct. 19, 1962, Ser. No. 231,785
9 Claims. (Cl. 156—50)

This invention relates to methods of making cables and particularly to new and improved methods of making an improved type of multiconductor communications cable.

The usual method of producing communications cable involves the five fundamental operations of wire drawing, insulating individual conductors, twisting pairs of conductors, stranding and cabling the twisted pairs into a cable core and finally applying a protective sheath over the cable core. During the stranding and cabling sequence, a plurality of twisted conductor pairs, ranging up to about 101 pairs, are bound together into cable units, and a predetermined number of core units are formed into a bound cable core. Of course, the cable core may comprise a single core unit, for example, including 25 conductor pairs. Some cable cores comprise over 2000 conductor pairs in a number of cable units.

A twisting operation is performed on the stranded cable core after stranding and cabling primarily in order to provide cable flexibility and prevent rigidity as the cable is built up with a plurality of conductors. For example, a cable core which may include a plurality of cable units as shown in Patent 3,031,524 to W. T. Hicks, is twisted approximately every 36 inches in order to make the cable flexible and facilitate its handling.

The core twisting operation is usually performed on a machine such as a flier strander. With present arrangements, cables are not processed in a continuous operation but are wound on take-up reels, etc. during twisting and then are fed to a sheathing line where a protective outer covering is applied.

It would be extremely advantageous to produce communications cable in a continuous flow arrangement. By the use of the new and improved processes embodying this invention, it is now possible to produce new, improved and more uniform cables than those which were possible by known procedures which included twisting.

It is an object of this invention to provide new and improved communications cables.

Another object of this invention is to provide new and improved methods of producing such cables in a continuous operation.

In accordance with the general features of this invention, a new type of communications cable embodying the invention may comprise a circuitously arranged cable core having one or more multiconductor units of an undulatory type. The core may be provided with a sheath of insulating material, a surrounding metal sheath and an external protective covering over the metal sheath.

This type of cable may be produced continuously by passing one or more cable units through a stranding and cabling apparatus and then through an undulating apparatus having guiding and forcing members spaced alternately on opposing sides of the core at predetermined intervals to force the cable core into an undulatory form. The undulating apparatus is similar to that described in the copending application of H. C. Slechta, Serial No. 163,284, filed December 29, 1961 and now Patent No. 3,207,836. The core is enclosed within successive protective sheaths and then passes through an extruder where an external covering of a suitable material, such as polyethylene, is extruded thereover. Thus, when the core is fed to the undulating apparatus, the cable is unsheathed that is, it consists solely of a plurality of conductors. Of course, at this time the plurality of conductors are bound together by one or more binders. The cable sheaths are applied at later stages of the process.

The undulating process embodying the present invention, not only provides desired flexibility but, in effect, produces a more uniform core having desirable conductor slack for making terminations in a more efficient and expeditious manner than the twisted cable which is produced by methods known in the prior art.

Other objects and advantages of the invention will be apparent from the following detailed description, when read in conjunction with the accompanying drawings, wherein:

FIG. 1 illustrates an apparatus for practicing a novel continuous process for making a cable embodying the present invention;

FIG. 2 represents a section of cable produced by means of the apparatus shown in FIG. 1; and FIG. 3 is an end view of a portion of the apparatus shown in FIG. 1.

Referring now to FIG. 1 of the drawings, there is shown a cable production apparatus which includes a supply arrangement 11, unit binding means 12 and cabling apparatus 13. The production line also includes a core undulating apparatus such as the capstan 59, a former 42 for applying a sheath about the undulated core 40, an extruder 51 for covering the sheathed core with an outer protective covering and take-up means 56.

In accordance with this invention, it is proposed to manufacture cable in a continuous process. The novel process includes the steps wherein pairs of conductors 10 (FIG. 1) are bound and formed into cable units 20 and subsequently formed into a cable core 30 in a cable stranding operation. The cable core 30 is displaced from a fixed path at predetermined intervals in opposite directions along its length into a configuration such as the undulated form 40 of FIG. 2. The displaced core 40 is covered with one or more protective coverings of material, for example, an inner Mylar envelope 43, an aluminum sheath 44 and an outer sheath of polyethylene 45. A single covering such as one of an extruded plastic may be sufficient.

A plurality of conductors 10, suitably disposed to prevent cross-talk, are payed off supply stands 11 and threaded through wire guides 19 to oscillating heads 21. A unit stranding apparatus 12 forms a cable unit 20 and applies one or several binders in a prescribed manner. Customarily a binder comprises a narrow tape or thread which is applied about the conductors. In the next operation, the cabler 13 forms the units 20 into a core 30 as the units 20 advance through guide 22, dies 23 and binders 24. The counter 26 records cable length, which for a typical reel may run to several thousand feet of multi-unit cable.

The cable core 30 is advanced through the line by a suitable device, such as a tractor capstan 59, which is provided with a plurality of suitably shaped guiding undulating elements 61 spaced alternately on opposing belts 62 at predetermined intervals. In one illustrative embodiment, the guiding elements 61 comprise open-ended blocks mounted on opposing belts 62 of the capstan 59. The block configuration is dependent on factors such as core size or conductor insulation, and the outer ends of the blocks may be substantially U-shaped or V-shaped.

The open ends 63 of the guiding elements 61 lie in overlapping horizontal planes and, as a result, the cable core 30 is displaced laterally from its longitudinal axis into an undulated form 40. This operation is depicted in FIG. 1 as occurring in a single step but in some instances, it might be preferable to undulate the core 30 in several steps or to undulate individual units and then combine the undulated units into a cable core. Also, it might be desired to displace the core 30 with respect to the core axis in one or more different planes and the capstan 59 could easily be changed to accommodate such arrangements. For example, the cable core 30 might first be displaced at longitudinal intervals in one radial plane and then in another radial plane. The tractor capstan is driven by a commercial drive means 64.

FIG. 3 shows an end view of the guiding elements 61 which displace the cable core 30 from its original longitudinal axis. The guiding elements 61 are provided with conventional connecting means 71 for attachment to the opposing belts 62 of the capstan device 59. Variations in the size and configuration of the elements may be made in order to accommodate cables of different types or sizes.

A core twisting operation is not required in this instance since the excess conductor in the undulated core 40 provides sufficient cable flexibility. This makes it possible to feed the core 40 to a sheathing operation without interrupting the process flow as shown in FIG. 1. It will thus be obvious that since no twist or lay is imparted to the cable core, the individual conductors 10 remain in substantially the same positions along the core 30 which they occupied when combined into the core. In a cable having a twisted core, the angular positions of the conductors vary continuously along the core.

The thus undulated core 40 is covered with one or more protective sheaths in a forming operation, using a well-known type of former 42 to wrap a sheath or sheaths thereabout. Care must be taken not to smooth out the core undulations 66 during sheathing. One method of retaining the excess conductor footage of the undulated core 40 is to use a loosely fitting insulating sheath 43 of a material like Mylar or polypropylene and a butted aluminum sheath 44, with the diameter 67 of the sheath 44 approximately equal to the amplitude of the undulations 66. Cable flexibility can thereby be attained, because the core 40 may elongate and contract within the sheath 44. For some applications, the metal sheath 44 may be omitted entirely and an outer plastic covering may be applied directly over the core 40 or over a loosely fitting protective envelope 43 surrounding the core 40.

The sheathed cable core 70 proceeds from the former 42 to an extruder 51 wherein a covering 45 of a suitable material, such as polyethylene or a similar protective material, is extruded over the metal sheath 44. The outer surface of the convering 45 is symmetrical throughout its length about the core axis. The plastic covered cable passes through a cooling jacket 52 which facilitates rapid setting of the extruded sheath. An auxiliary drive means for the cable line, shown in the form of a capstan 54 actuated by motor means 68, may be provided to help move the cable through the line to suitable guiding means 57 which directs the cable onto a take-up reel 56. A control arrangement 58 is provided for process regulation.

FIG. 2 shows a section of a novel cable produced by a continuous process embodying this invention. The cable comprises one or more cable units 20, each having a plurality of paired conductors 10, situated within a suitable single sheath 44, or sheaths 43 and 44. The sheath 44 may be made of a metal, such as corrugated aluminum, in order to permit flexing of the cable. The outer covering 45 is completely symmetrical with respect to the core axis, i.e., there are no deviations in the outer surface of the sheath at any point about the core axis.

The core 40 is illustrated as having an undulated form with excess conductor length to facilitate handling and making terminations. The undulated core 40 provides cable flexibility by allowing the core 40 to stretch and retract within the sheath 44. Ready access to the individual conductors is obtained by keeping the core 40 in a relatively loose condition contrasting with the tight twisted cores of the prior art. No problem is encountered in winding the multi-unit undulated cables 50 on reels 56 or in placing them in their final environment.

It is to be understood that the above described arrangements are simply illustrative of the principles of the invention. Numerous other arrangements may be readily devised by those skilled in the art which will embody the principles of the invention and fall within the spirit and scope thereof.

What is claimed is:

1. The method of making cable comprising:
   combining a plurality of conductors into a cable core,
   advancing the core while maintaining the conductors in substantially the same positions along the core consisting solely of said conductors occupied by the conductors about the core axis when combined into the core,
   setting undulations in the advancing core with the conductors in said same positions by forcing the core alternately in opposite directions normal to the cable axis to impart flexibility to the core, and
   applying at least one protective sheath having an inner diameter sufficiently greater than the diameter of the core about the undulated cable core to enable the core to move longitudinally with respect to the sheath.

2. The method of making cable comprising:
   combining a plurality of individually insulated conductors into a cable core,
   feeding the core consisting solely of said conductors to a former while maintaining the conductors substantially in the same cross-sectional positions along the core occupied by the conductors when combined into the core,
   setting undulations in the core by advancing the cable core through the former and displacing the core alternately in opposite directions normal to the cable axis to impart flexibility to the core, and
   extruding a substantially circular plastic sheath of insulating material about the core.

3. The method of making cable comprising:
   combining a plurality of individually insulated conductors into a cable core,
   feeding the core consisting solely of said conductors to a former while maintaining the conductors substantially in the cross-sectional positions along the core occupied by the conductors when combined into the core,
   setting undulations in the core by advancing the cable core through the former and displacing the core alternately in opposite directions normal to the cable axis to impart flexibility to the core,
   applying at least one inner protective sheath having an inner diameter sufficiently greater than the diameter of the core about the undulated core to enable the core to move longitudinally with respect to the sheath, and
   extruding a substantially circular plastic sheath about the sheathed core.

4. The method of making cable in accordance with claim 3 comprising:
   applying an inner metal sheath longitudinally about the cable core.

5. The method of making cable in accordance with claim 3 comprising:
   applying a protective sheath of insulating material about the core, and
   applying a protective metal sheath about the sheath of insulating material.

6. The method of making telephone cable in a continuous process comprising:

combining a plurality of conductor pairs into a cable core, feeding the cable core consisting solely of said conductors directly to a former while maintaining the cross-sectional positions of the conductor pairs within the core in the same angular positions along the core occupied by the conductor pairs about the core axis when combined into the core, forcing the cable core into an undulatory configuration by advancing the cable core through the former and displacing the cable core alternately in opposite directions normal to the cable axis in a predetermined number of separate steps to impart flexibility to the core, and applying at least one protective sheath having an inner diameter sufficiently greater than the diameter of the core about the undulated core to enable the core to move longitudinally with respect to the sheath.

7. The method of making long lengths of cable in a continuous process comprising:

combining a pluarlity of insulated conductors into a predetermined number of separate cable units, feeding the cable units, consisting solely of said conductors to individual undulating means while maintaining the cross-sectional positions of the conductors along the core within each unit, setting undulations in each cable unit by advancing the cable units through individual undulating means and displacing each unit alternately in opposite directions normal to the unit to impart flexibility to the units, combining the predetermined plurality of undulated cable units into an undulatory cable core, and applying at least one protective covering about the cable core.

8. The method of making cable comprising:

grouping a plurality of conductors into a predetermined number of cable units including imparting an intermittently reversed twist to the conductors and binding each unit with an identifying binder, combining the cable units to form a cable core, setting undulations in the cable core consisting solely of the plurality of bound conductors in a single plane by displacing the cable core at selected longitudinal intervals to impart flexibility to the core, surrounding the undulated core with a metal sheath having an inner diameter approximating the amplitude of the core undulations to enable the core to move longitudinally with respect to the sheath, and sheathing the undulated cable core and surrounding metal sheath with a protective and completely circular outer covering.

9. The method of making cable in a continuous process comprising:

combining a plurality of individually insulated conductors into a cable core, advancing the core consisting solely of said conductors while maintaining the conductors in substantially the same positions along the core occupied by the conductors about the core axis when combined into the core, forcing the advancing core into a predetermined undulated configuration by displacing the core from the core axis in different planes to impart flexibility to the core, and applying at least one substantially circular protective sheath about the undulated core.

References Cited by the Examiner

UNITED STATES PATENTS

| 747,515 | 12/1903 | Tremain | 174—34 |
| 2,426,904 | 9/1947 | Tunnicliff | 156—54 |
| 2,434,793 | 1/1948 | Feaster | 156—56 XR |
| 2,565,634 | 8/1951 | Taylor | 156—54 |
| 2,636,923 | 4/1953 | Perzel | 156—56 XR |
| 3,017,450 | 1/1962 | Crosby et al. | 174—34 |
| 3,087,007 | 4/1963 | Jachimowicz | 156—54 XR |
| 3,128,214 | 4/1964 | Lay | 156—55 |

FOREIGN PATENTS 2,449-57   9/1857   Great Britain.

EARL M. BERGERT, *Primary Examiner.*

JOHN P. WIELDMAN, *Examiner.*